Nov. 9, 1926. 1,606,672
S. STAMIROWSKI
CHAIN FASTENER
Filed May 24, 1926

WITNESSES
Edw. Thorpe
Franklin J. Foster

INVENTOR
Stefan Stamirowski
BY Munn & Co
ATTORNEYS

Patented Nov. 9, 1926.

1,606,672

UNITED STATES PATENT OFFICE.

STEFAN STAMIROWSKI, OF NEW YORK, N. Y.

CHAIN FASTENER.

Application filed May 24, 1926. Serial No. 111,413.

The present invention is concerned with the provision of a chain fastener which may have a wide range of utility in the arts but which is peculiarly suited for attaching the cross tread members of an automobile tire chain to the annular runs thereof.

An object of the invention is to provide a device of this character which will not only securely lock the cross tread elements in place but which may be applied and removed with facility and expedition.

Further objects of the invention are to provide a chain fastener of the character noted above which will be of simple, practical construction, which will be rugged, durable and efficient in use and which may be manufactured with comparative economy.

With the above noted and other objects in view, the invention consists in certain novel features of construction and combinations and arrangements of parts as will be more fully hereinafter described and set forth in the claims.

The invention may be more fully understood from the accompanying drawings, wherein—

Figure 1:
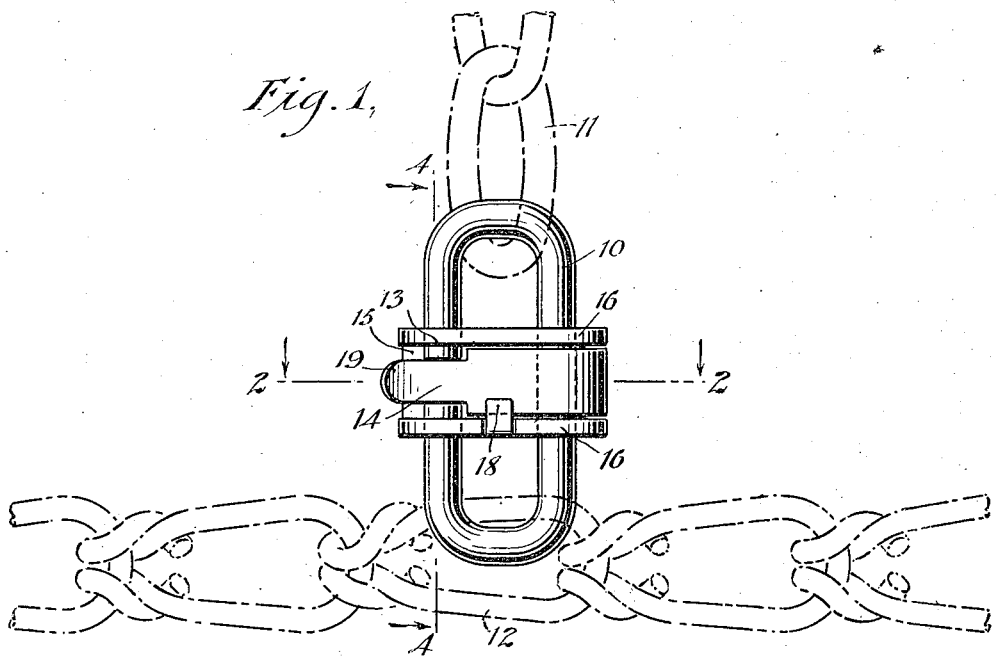
Figure 1 is a plan view of a chain fastener embodying the present invention, showing the fastener in closed and locked position and indicating in dotted lines the cross tread and annular chain connected thereby.

The fastener element of the present invention, generally speaking, includes an approximately oval link portion 10, the ends of which are adapted to be engaged with a link 11 of a cross tread chain and a link 12 of an annular chain, respectively. At approximately the central portion of one of its sides, the link 10 is formed with an opening 13, through which the links 12 and 11 are adapted to be passed. A spring tongue 14 normally closes the opening 13, and the member which carries the tongue is slidable on the link 10 to uncover the opening 13 when the tongue has been retracted.

The slidable element includes an approximately channel shaped member formed with an intermediate portion 15 and upstanding side flanges 16 having pairs of aligned openings therein for the reception of the sides of the elongated link 10. Preferably, the spring tongue 14 is integral with the channel shaped member and constitutes a reversely bent extension of the intermediate portion 15. A lug 18 struck inwardly from one of the flanges 17 limits the outward springing movement of the tongue 14, and the rounded projecting end 19 of the tongue offers a convenient hand hold for manually depressing the tongue to permit sliding movement of the channel member on the link.

Figure 2:
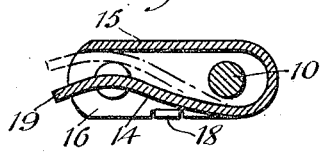
Figure 2 is a transverse sectional view on the line 2—2 of Figure 1.
Figure 4:
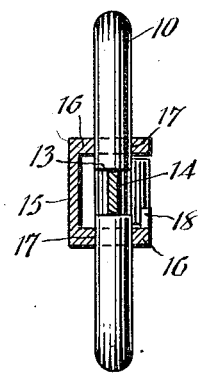
Figure 4 is a longitudinal sectional view on the line 4—4 of Figure 1.
Figure 3:
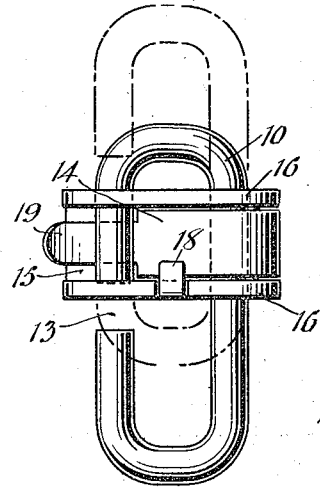
Figure 3 is a plan view of the chain fastener showing the same opened to receive a link of the annular chain and indicating in dotted lines the fastener oppositely bent to receive a link of the cross tread chain.
Figure 5:
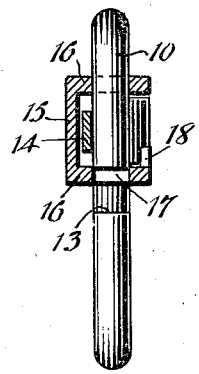
Figure 5 is a similar view illustrating the fastener open.

In Figure 1, I have shown the sliding member in its intermediate position with the tongue 14 disposed in the break 13 of the link and effectively blocking relatively sliding movement of the link and the channel member. To permit such movement, the free end of the tongue is pressed toward the intermediate portion 15 of the link, as shown in dotted lines in Figure 2, so that the tongue clears the ends of the link. Channel member 15 may then be shifted in either direction relative to the link 10, as indicated in Figures 3 and 5. The extent of sliding movement of the channel member relative to the link is sufficient to expose the opening 13 at either side of the channel member depending upon which direction such member is slid. With the channel member in one extreme position, as shown in Figures 3 and 5, the link 12 of the cross chain may be entered into the link 10, and with the channel member and link relatively slid to their opposite extreme position indicated in dotted lines in Figure 3, opening 13 will be disposed on the opposite side of the channel member and the link 11 may be entered into the link 10. After the link 10 has been engaged with the two links 11 and 12, the channel member is again slid to its intermediate position and the tongue 14 will spring into the opening 13, effectively blocking relative sliding movement of the link and channel member.

Various changes and alterations might be made in the general form and arrangement of the parts described without departing from the invention, and, hence, I do not wish to limit myself to the precise details set forth, but shall consider myself at liberty to make all changes and alterations which fairly fall within the spirit and scope of the appended claims.

I claim:

1. A chain fastener including an elongated rigid loop-like link, the sides of which are parallel and one of which is formed with an opening therein, a member slidable on the link and including a spring tongue adapted to snap between the ends of the link and block said opening, said sliding member including a channelled element, the side flanges of which are formed with aligned openings receiving the two parallel side pieces of the link, and the intermediate portion of which is formed with a reversely bent extension constituting the spring tongue.

2. A chain fastener including an elongated loop-like link, the sides of which are parallel and one of which is formed with an opening therein, a member slidable on the link and including a spring tongue adapted to snap between the ends of the link and block said opening, said sliding member including a channelled element, the side flanges of which are formed with aligned openings receiving the two parallel side pieces of the link, and the intermediate portion of which is formed with a reversely bent extension constituting the spring tongue and extending beyond the ends of the flanges to offer a handle for depressing the tongue to permit relative sliding movement of the link and channelled member.

STEFAN STAMIROWSKI.